N. CLARK.
Irrigation-Pipes.
No. 146,572.             Patented Jan. 20, 1874.
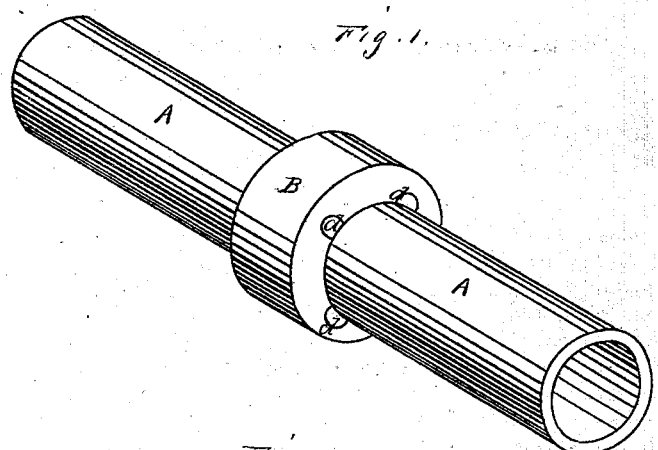
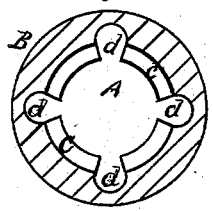
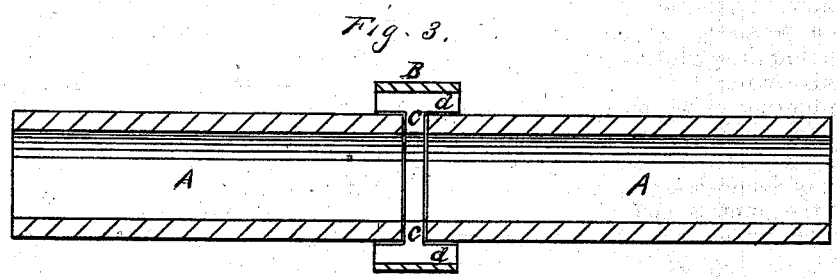

UNITED STATES PATENT OFFICE.

NEHEMIAH CLARK, OF SACRAMENTO, CALIFORNIA.

IMPROVEMENT IN IRRIGATION-PIPES.

Specification forming part of Letters Patent No. 146,572, dated January 20, 1874; application filed December 15, 1873.

*To all whom it may concern:*

Be it known that I, N. CLARK, of Sacramento city and county, State of California, have invented an Irrigation-Pipe; and I do hereby declare the following description and accompanying drawings are sufficient to enable any person skilled in the art or science to which it most nearly appertains to make and use my said invention without further invention or experiment.

The object of my invention is to provide an improved pipe for the purpose of irrigation; and it consists mainly in the employment of a main conducting-pipe, constructed in lengths, the ends of these lengths meeting within a short section of larger size, which prevents clogging and retains the main conducting-pipes in line, but allows the water for irrigating purposes to pass out at the joint.

Referring to the accompanying drawings for a more complete explanation of my invention, Figure 1 is a perspective view of my pipe. Fig. 2 is a section through the joint. Fig. 3 is a longitudinal section.

A is a conducting water-pipe, of any suitable size and material. This pipe is made in lengths, and the ends of these lengths meet within a pipe of somewhat larger size. In the present case the joint is made within the enlarged section B, which is so constructed as to receive an end of each of the meeting-pipes. Within the section B is formed a sort of flange or stop, C, against which the ends of the pipes A abut, and by which they are kept separated a short distance. Perforations $d\ d$ are made longitudinally through this flange and in the body of the section B, as shown, the perforations connecting with the space between the ends of the pipes A, so that water can flow out through the holes, while the section will protect the ends of the pipes, keep them in line, and prevent the ingress of dirt, and consequent clogging of the pipes.

By this construction I am enabled to make a cheap and efficient irrigation-pipe.

Having thus described my invention, what I claim, and desire to secure by Letters Patent, is—

An irrigation-pipe consisting of the pipes A A, in combination with the enlarged section B, either plain or provided with the interior flange and the perforations, substantially as and for the purpose herein described.

In witness whereof I hereunto set my hand and seal.

NEHEMIAH CLARK. [L. S.]

Witnesses:
SAMUEL POORMAN,
CHRISTOPHER GREEN.